Patented May 18, 1937

2,080,954

UNITED STATES PATENT OFFICE 2,080,954

PROCESS FOR THE MANUFACTURE, SEPARATION, AND PREPARATION OF PURE CRYSTALLIZED ERGOT-ALKALOIDS

Arthur Stoll and Ernst Burckhardt, Basel, Switzerland, assignors to Chemical Works Formerly Sandoz, Basel, Switzerland No Drawing. Application February 25, 1935, Serial No. 8,214. In Germany October 1, 1934

7 Claims. (Cl. 87—28)

The present invention relates to an improved process for the manufacture, separation and preparation of pure ergot-alkaloids.

It is known that by using the chromatographic adsorption analysis, suggested by Tswett in 1906 and developed for laboratory purposes by R. Kuhn, A. Winterstein and P. Karrer, it is possible to separate the dyestuffs of the leaves. For instance the preparation of chlorophylls and of carotinoids in pure state has also been realized by this method. It is further possible with the aid of ultraviolet rays, which allow to differentiate unsaturated hydrocarbons of high molecular weight from one another on account of their fluorescence, to prepare same in a very pure state.

The present invention relates to the manufacture, separation and preparation of ergot-alkaloids in state of high purity, by subjecting mixtures of the very sensitive ergot-alkaloids to chromatographic adsorption analysis.

Until now only two pairs of well defined ergot-alkaloids are known. These are: the pair of ergotoxin and ergotinin, which can be transformed one into the other, and the pair of ergotamin and ergotaminin, which can also be transformed one into the other. Recently, two new well crystallized ergot-alkaloid-preparations, called Sensibamin (see British patent No. 388,529) and Ergoclavin (see German patent No. 606,778) have been described.

By systematic tests with known mixtures of ergot-alkaloids it has been found, that when solutions of such mixtures in inert solvents are allowed to pass through an adsorption column, the more easily soluble and active alkaloids of ergot, the ergotamin and ergotoxin, are retained by the adsorption media and not, as it ought have been expected, the difficultly soluble and physiologically less active alkaloids, ergotaminin and ergotinin. By using this method it becomes, therefore, possible to separate the active and valuable alkaloids from the impurities or less active principles and to obtain these alkaloids in pure crystallized form.

Another possibility was that the amphoteric reacting alkaloids ergotamin and ergotoxin would react with the basic adsorption media, such as aluminium oxide, and give salt-like compounds; but this does not occur, as can easily be shown by the following test. By shaking a chloroform-solution of a mixture consisting of the levorotary and easily soluble ergotamin and of the dextrorotary and difficultly soluble ergotaminin with aluminium oxide, only a small part of the alkaloids is retained by superficial adsorption, as is shown by a small decrease of the optical rotation; a selective adsorption of the levorotary ergotamin would have occasioned a substantial increase of the dextrorotation of the solution.

By subjecting the same solution to the chromatographic adsorption process, it is found that the levorotary ergotamin is retained within the adsorption column, whereas the difficultly soluble dextrorotary ergotaminin runs first through it. As the optical activity of these isomers in chloroform is very different—

$$\left(\text{Ergotamin } [\alpha]_D^{20} = -155° \text{ and } \text{Ergotaminin } [\alpha]_D^{20} = +381°\right),$$

it is easy to control the separation of the two alkaloids by means of the polarimetric method.

It is also possible to control the separation of the alkaloids by irradiating their solutions with ultraviolet light, as it is known that in this light the ergot-alkaloids possess a violet to blue fluorescence.

If, therefore, the adsorption column containing the solution of a mixture of the alkaloids ergotamin-ergotaminin is irradiated with ultraviolet light, it will be seen that the lower part of the column contains a zone rich in alkaloid, the middle part is very poor in alkaloids and the upper part contains again a zone rich in alkaloid visible by its violet-white fluorescence. If the separation of the zones in the column is not distinct, the chromatographic process should be repeated with the single fractions, until quite pure compounds are obtained.

According to the present invention it becomes possible not only to separate pure mixtures of ergotamin-ergotaminin or of ergotoxin-ergotinin into their components in a high degree of purity, but also to work up such raw extracts of ergot, that contain impurities of a non-alkaloidic character.

The examination of the ergot-preparation called Sensibamin, which possesses in chloroform the optical rotation of $$[\alpha]_D^{30} = +125°,$$

has shown that this preparation can easily be separated by means of the chromatographic method into a dextro- and a levorotary fraction. The levorotary fraction obtained thereby contains ergotamin, whereas the dextrorotary fraction contains ergotaminin.

As the arithmetical middle of—

$$\left[\alpha\right]^{20}_{D}$$

calculated from the levo-rotation of the ergotamin and from the dextro-rotation of ergotaminin is about +113°, this calculated value approaches very closely the value given for Sensibamin and confirms the fact that this product consists of the above cited two alkaloids.

In the same manner it is also possible to separate the product called Ergoclavin into a levorotary and a dextrorotary component.

The chromatographic process also makes it possible to prepare crystallized pure ergotoxin, which crystallizes very difficultly and which generally has been obtained in an amorphous impure state.

All the known processes heretofore used for the separation and preparation of pure ergot-alkaloids are completely different from the process herein described, as indifferent adsorption media used in the process of Tswett have never been used for this purpose. The possibility of separating and of preparing the very sensitive ergot-alkaloids even from impure mixtures by the chromatographic process and without the use of any chemical reagents, represents a very valuable process and a great improvement of the art.

In order to carry out the present process, raw extracts or solutions of ergot-alkaloids are dissolved in indifferent solvents, for example aromatic hydrocarbons, such as benzene, toluene and/or homologues; halogenated hydrocarbons, such as chloroform, dichlorethylene, tetrachlorethane, trichlorethylene or mixtures of such solvents, and these solutions are allowed to flow through a column containing adsorbents, such as sugar, milk-sugar, aluminium oxide, aluminium hydroxide, silicon dioxide, calcium oxide, calcium carbonate, asbestos, fibrous aluminium hydroxide, that are insoluble in the solvents used. On addition of further amounts of solvents, the chromatogram becomes developed in the adsorption column and can be seen on irradiation with ultra-violet light.

One object of the present invention is, therefore, a process for the manufacture, separation and preparation of pure ergot-alkaloids, consisting in subjecting raw or pure mixtures of ergot-alkaloids or impure ergot-alkaloids to the chromatographic adsorption process.

Another object of the present invention is the method allowing the separation and preparation of pure alkaloids of ergot, consisting in subjecting the solutions of the above said mixtures of ergot-alkaloids in inert solvents to the chromatographic adsorption process.

Another object of the present invention is the use of the chromatographic adsorption process for the preparation of ergot-alkaloids in pure state.

Still another object of the present invention is the use of adsorption columns containing such adsorbents, that are insoluble in the solvents, in which the mixtures of ergot-alkaloids are dissolved for the purpose of subjecting them to the chromatographic adsorption process.

The following examples, without being limitative, illustrate the manner in which the present process can be carried out and show the preparation of pure alkaloids from raw-extracts or from mixtures of known alkaloids. The process described in the examples can be carried out on technical scale with greater quantities of alkaloids with any difficulty.

*Example 1*

Separation of a mixture of ergotamin and ergotaminin.

A vertical glass tube of 40 cm. length and 22 mm. internal diameter, provided at the lower part with a filter and connected to a rubber tube, is filled under suction and light pressing successively with 120 g. of aluminium oxide (prepared according to Brockmann). In this manner a column of about 34 cm. height of adsorption medium is obtained, which is first impregnated with chloroform, the chloroform being allowed to run through the lower opening of the tube, until it reaches a level at a height of 2 to 3 mm. above the top of the adsorbent medium. Thereupon a solution of 0.5 g. of ergotamin and of 0.5 g. of ergotaminin in 100 ccm. of chloroform is introduced into the tube. As soon as the whole alkaloid solution has completely leaked in the adsorption column, a further quantity of chloroform is added and on irradiation of the tube with ultra-violet light a formation of layers in the adsorption medium can be observed. A relatively small layer rich in alkaloid is pushed forward and runs first out of the tube, then follows a zone poor in alkaloids, and in the upper part of the tube a second, large alkaloid layer, recognized by its violet-white fluorescence will be present.

The solution flowing out of the tube is carefully collected in fractions and each fraction is examined. The first 50 ccm. of the solution show in a polarimetric tube of 2 dm. a rotation of +8.38°. In the following 200 ccm. of the solution the dextrorotation becomes lower and lower as the concentration in alkaloid is only very small. After these intermediate fractions, which are poor in alkaloids, fractions follow which are levorotary and contain ergotamin. In spite of the fact that ergotamin is more easily soluble in chloroform than ergotaminin, it will be extracted only later from the adsorption column and is found in the last fractions. The dextrorotary fractions are then evaporated in vacuo at a low temperature and yield 0.52 g. of a product, which on single recrystallization from pyridine gives pure ergotaminin with a high yield. The levorotary fractions give after careful evaporation 0.33 g. of pure ergotamin, which on crystallization from aqueous acetone yields the typical columns of the ergotamin-acetone-water-crystals.

*Example 2*

Separation of a mixture consisting of ergotoxin and ergotinin.

0.5 g. of amorphous ergotoxin base and 0.5 g. of crystallized ergotinin are dissolved in 100 ccm. of chloroform and allowed to pass through an adsorption column in the manner described in Example 1. After formation of the adsorption layers and on washing out with chloroform, the first fractions obtained are dextrorotary, whereas the fractions following those which are poor in alkaloids, are levorotary.

The dextrorotary fractions yield on careful evaporation at a low temperature crystallized ergotinin. By dissolving the residue obtained after evaporation of the levorotary fractions, in a small quantity of benzene, prisms of ergotoxin are obtained which correspond exactly to those described in British Patent No. 286,400.

Although amorphous ergotoxin base has been used as starting product, it is possible to obtain by the present process in a very simple way crystallized ergotoxin, whereas according to the known processes it is necessary, in order to obtain a product of such purity, to subject ergotoxin phosphate to repeated crystallizations, which obviously reduce the yield in pure product.

*Example 3*

Separation of Sensibamin into its components. 1 g. of the product called Sensibamin and prepared according to the process described in British Patent No. 388,529 is dissolved in 100 ccm. of chloroform and allowed to pass through an adsorption column in the manner described in the above examples. The separation of the product into dextrorotary ergotaminin and levorotary ergotamin occurs in the same manner as when a mixture of these alkaloids is used. After formation of the layers and treatment with the solvent, the first fractions obtained contain ergotaminin, whereas the following levorotary fractions yield ergotamin.

The product called Ergoclavin and prepared as described in German Patent No. 606,778 is decomposed in the same manner into a levorotary and a dextrorotary fraction, whereby in the separating operation the first fractions contain the dextrorotary, the following fractions the levorotary alkaloid.

*Example 4*

Preparation of pure ergotamin from a raw-extract.

100 ccm. of a benzene extract from ergot, prepared as described in Example 2 of German Patent No. 357,272 and containing, besides ergotamin, ergot-oil and other impurities are allowed to pass through an adsorption column containing 120 g. of a finely powdered milk-sugar, which has previously been impregnated with benzene. On addition of further quantities of benzene, the first fractions flowing out contain only ergot-oil, but no alkaloids, the following fractions contain only traces of dextrorotary ergotaminin. The main alkaloid fraction follows thereupon and contains the levorotary ergotamin in a high degree of purity. After careful evaporation in vacuo and at low temperature, the residue of these last fractions is recrystallized from aqueous acetone and yields water-clear, strongly light breaking rhombic prisms and tables of ergotamin-acetone-water.

*Example 5*

Preparation of crystallized ergotoxin from ergot raw-extracts.

From an ergot drug which contains ergotoxin there is first prepared according to the known processes a mixture containing all ergot-alkaloids. 1 g. of such product is then dissolved in 50 ccm. of chloroform and allowed to pass through an adsorption column in the manner described in Example 1. On addition of further quantities of solvent, the first fractions obtained contain no alkaloids, but only impurities; then follow dextrorotary fractions from which a more or less great quantity of crystallized ergotinin, according to the quality of the drug used, can be isolated. The following fractions are levorotary and yield after careful evaporation of the solvent in vacuo and at normal temperature a residue, which, when dissolved in benzene, immediately yields crystallized pure ergotoxin base.

What we claim is:—

1. A process for the production of pure crystallized ergot-alkaloids, comprising passing a solution of ergot-alkaloids in an inert organic solvent, selected from the class consisting of aromatic and halogenated hydrocarbons, through a column containing adsorbent material which is insoluble in the said solvent and is selected from the class consisting of sugar, milk-sugar, aluminum oxide, aluminum hydroxide, silicon dioxide, calcium oxide, calcium carbonate, asbestos and fibrous aluminum hydroxide, whereby the solution is separated into a plurality of fractions, collecting the resultant fractions of the solution, and isolating the pure ergot-alkaloids from the collected fractions.

2. A process for the production of pure crystallized ergot-alkaloids, comprising passing a solution of a mixture of ergot-alkaloids in chloroform through a column containing adsorbent material which is insoluble in chloroform and is selected from the class consisting of sugar, milk-sugar, aluminum oxide, aluminum hydroxide, silicon dioxide, calcium oxide, calcium carbonate, asbestos and fibrous aluminum hydroxide, whereby the solution is separated into a plurality of fractions, collecting the resultant fractions of the solution, and isolating the pure ergot-alkaloids from the collected fractions.

3. Process for the production of pure crystallized ergot-alkaloids, comprising passing a solution of a mixture of ergot-alkaloids in chloroform through a column containing aluminum oxide, whereby the solution is separated into fractions, collecting the resultant fractions, and isolating the pure ergot-alkaloids from the collected fractions.

4. Process for the production of pure crystallized ergot-alkaloids, comprising passing a solution of a mixture of ergotamin and ergotaminin in chloroform through a column containing aluminum oxide, whereby the solution is separated into dextro- and levorotary fractions, collecting the said fractions, and isolating the alkaloids therefrom by evaporation of the solvent.

5. Process for the production of pure crystallized ergot-alkaloids, comprising passing a solution of a mixture of ergotoxin and ergotinin in chloroform through a column containing aluminum oxide, whereby the solution is separated into dextro- and levorotary fractions, collecting the said fractions, and isolating the alkaloids therefrom by evaporation of the solvent.

6. Process for the production of pure crystallized ergot-alkaloids, comprising passing a solution of raw extracts from ergot containing ergotoxin and ergotinin in chloroform through a column containing aluminum oxide, whereby the solution is separated into dextro- and levorotary fractions, collecting the resultant fractions, and isolating the alkaloids therefrom by evaporation of the solvent.

7. Process for the producton of pure crystallized ergot-alkaloids, comprising passing a solution of raw extracts from ergot containing ergotamin and ergotaminin in chloroform through a column containing aluminum oxide, whereby the solution is separated into dextro- and levorotary fractions, collecting the resultant fractions, and isolating the alkaloids therefrom by evaporation of the solvent.

ARTHUR STOLL.
ERNST BURCKHARDT.